Figure 1:
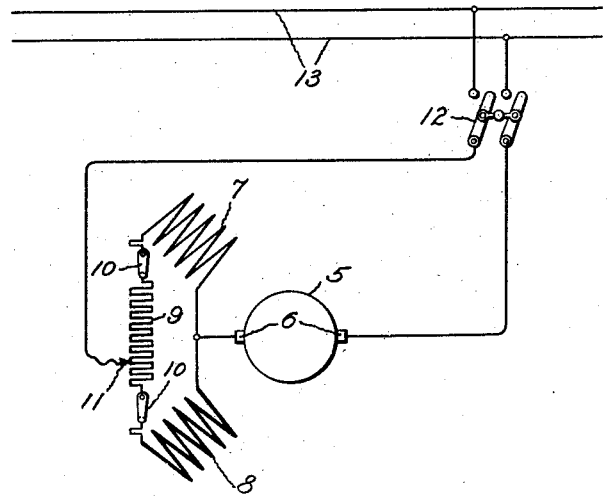

S. R. BERGMAN.
DYNAMO ELECTRIC MACHINE.
APPLICATION FILED JUNE 18, 1917.

1,265,594.

Patented May 7, 1918.

Inventor:
Sven R. Bergman,
by Albert G. Davis
His Attorney.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,265,594.  Specification of Letters Patent.  Patented May 7, 1918.

Application filed June 18, 1917. Serial No. 175,323.

*To all whom it may concern:*

Be it known that I, SVEN R. BERGMAN, a subject of the King of Sweden, residing at Nahant, county of Essex, State of Massachusetts, have invented certain new and useful Improvements in Dynamo-Electric Machines, of which the following is a specification.

My invention relates to dynamo-electric machines, and more particularly to dynamo-electric machines in which the armature reaction is neutralized and the exciting flux of the machine is produced by a single field winding whose magnetizing axis is displaced approximately 45 electrical degrees from the magnetizing axis of the armature winding. The object of the invention is to provide an improved compensated dynamo-electric machine adapted to run at varying speeds in either direction. More specifically, the object of the invention is to provide a reversible variable speed series compensated dynamo-electric machine in which the field winding has its magnetizing axis displaced approximately 45 electrical degree from the magnetizing axis of the armature winding.

It is well known that the completely distributed exciting and compensating windings of a compensated dynamo-electric machine with series excitation can be combined into a single field winding having its axis of magnetization displaced approximately 45 electrical degrees from the axis of magnetization of the armature winding. In such a machine, the 45-degree field winding produces a flux which may be considered as having two components one of which compensates or neutralizes the armature reaction while the other provides the exciting field of the machine. The exciting field of such a machine cannot be altered without unbalancing the compensation, because the single 45-degrees field winding is connected in series with the armature winding. In the case of the ordinary series machine having an independent exciting winding with its magnetizing axis in quadrature to the magnetizing axis of the armature winding, a variable exciting field can be very conveniently obtained by shunting the series exciting winding by a variable resistance, but obviously such an arrangement is impossible in a machine having a single 45-degree field winding, since the compensating component of the flux produced by this winding would be affected to the same extent as the exciting component. Furthermore, the machine with a single 45-degree field winding runs efficiently in only one direction, because when the direction of current-flow in either the armature or field windings is reversed the compensating component of the field winding flux is in the wrong direction and the effective armature reaction of the machine becomes excessive. Both of these difficulties are overcome in the improved machine of my present invention. In the preferred form of the invention, I place two 45-degree field windings on the stator so that their magnetizing axes are 90 electrical degrees apart, and connect these field windings in parallel with one another in series with the armature winding, and provide means for varying the ratio of the currents flowing in the two field windings.

Figure 2:
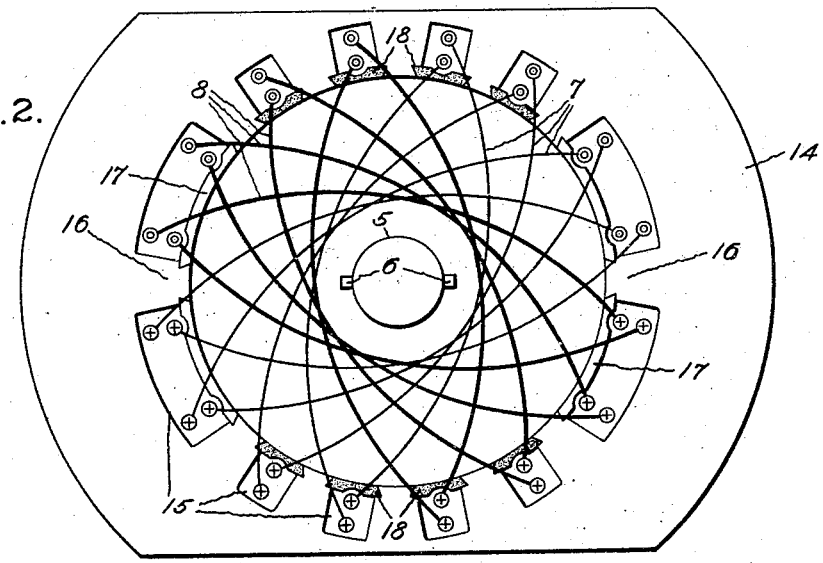

The novel features of my invention which I believe to be patentable are definitely set forth in the appended claims. These features together with the construction and mode of operation of a dynamo-electric machine embodying the same will be best understood from the following description taken in conjunction with the accompanying drawings, in which;

Figure 1 is a diagrammatic view of a dynamo-electric machine embodying the present invention; and Fig. 2 is a diagrammatic view of the preferred arrangement of the two field windings of the machine of Fig. 1.

In Fig. 1 of the drawings, there is diagrammatically illustrated a direct current dynamo-electric machine having a commutated armature winding 5 and coöperating brushes 6. The field magnet member of this machine carries two field windings 7 and 8. These windings are so arranged on the stator frame that their magnetizing axes are displaced approximately 45 electrical degrees from the magnetizing axis of the armature winding and 90 electrical degrees from each other. The 45-degree stator windings 7 and 8 are connected in parallel with one another and in series with the armature winding 5. The outer terminals of the field windings 7 and 8 are connected to the terminals of a resistance or rheostat 9. Switches 10 are provided so that either field winding may be disconnected from the resistance. The resistance has a movable contact-terminal 11 which is electrically connected to one pole of the switch 12. The other pole of the switch 12 is connected to the other commutator brush 6. The switch 12 serves to connect the machine to the DC mains 13.

The field windings 7 and 8 are preferably completely distributed lap windings interleaved to form mechanically a single winding. In Fig. 2 of the drawings, I have diagrammatically shown a bi-polar machine having a very satisfactory type of field winding embodying the principle of the present invention. The field magnet member 14 has an approximately rectangular outer periphery for the reasons described in my U. S. Letters Patent No. 1,173,089, patented Feb. 22, 1916. The inner circular periphery of the field magnet member 14 has a plurality of distributed slots 15. In order to obtain good commutation, I omit the next adjacent tooth on each side of the commutating teeth 16, whereby relatively wide slots are formed on each side of the commutating teeth. The wide slots are closed with non-magnetic wedges 17, and the other slots are closed by magnetic wedges 18 for the reasons fully described in my U. S. Letters Patent 1,173,090, patented Feb. 22, 1916.

I have represented the field winding 8 by slightly heavier lines than the field winding 7 so that these windings may be more easily distinguished in the drawings and also to indicate that a relatively greater current flows in the field winding 8 than in the field winding 7 for the particular position of the movable terminal 11 illustrated in Fig. 1. Current distribution in the conductors of the field windings 7 and 8 is shown in Fig. 2 by means of the usual convention in which crosses and circles indicate, respectively, that the current is flowing away from or toward the observer. The field windings 7 and 8 are preferably composed of uniform coils of 100 per cent. pitch. The coils of both windings may then be assembled as an ordinary lap winding so that mechanically the stator carries a single completely distributed field winding. It will be observed from Fig. 2, however, that the coils of the winding 7 form electrically a separate and independent field winding whose magnetizing axis is displaced approximately 45 electrical degrees from the magnetizing axis of the armature winding 5, while the coils of the winding 8 form a second electrically independent field winding whose magnetizing axis is also displaced 45 electrical degrees from the armature axis and is displaced 90 electrical degrees from the axis of the field winding 7.

It is believed that the operation of my improved machine will be fully understood by those skilled in the art from the foregoing description. The field windings 7 and 8 each produce a magnetic flux which may be considered as composed of two components one of which is in line with and opposite to the armature magnetization while the other component is in quadrature with the armature magnetization. The components of the field winding fluxes in line with the armature magnetization act in conjunction, while the components of these fluxes in quadrature with the armature magnetization act in opposition. The combined compensating components of the two field fluxes are designed to neutralize the armature reaction of the machine under all conditions of operation. Since the exciting components of the two field fluxes act in opposition, the direction of the resultant exciting field depends upon which field winding carries the greater current, while the strength of the exciting field depends upon the difference in magnitude of the currents flowing in the two field windings. When the movable contact-terminal 11 of the rheostat 9 is in its mid-position, equal currents flow through the two field windings 7 and 8, and while the armature reaction is neutralized by the resulting flux, there is no effective exciting flux, because the exciting components of the fluxes produced by the two field windings 7 and 8 just equal and neutralize one another. If the movable terminal 11 is moved in either direction from its mid-position, the exciting component of the flux of one of the field windings 7 and 8 will predominate and the motor will start in one direction or the other, depending upon which field winding carries the larger current. Thus, in moving the terminal 11 from its lower-most position, as viewed in Fig. 1, the exciting field of the machine is weakened from full field to zero field for clockwise direction of rotation, and in moving the terminal still farther in an upward direction the direction of rotation of the machine reverses and the exciting field is strengthened until the terminal 11 occupies its top-most position when the full field strength for counter-clockwise rotation is obtained. While movement of the terminal 11 varies and reverses the effective exciting field of the machine, still it will be observed that the effective or combined compensating components of the fluxes of the two field windings remain substantially unchanged, so that the machine is fully compensated no matter what the effective value of the exciting flux is. The direction of current flow in the armature winding 5 and in the field windings 7 and 8 remains the same for both directions of rotation so that the compensation is always in the right direction. By moving the rheostat terminal 11 to its extreme position in one or the other direction and opening the adjacent switch 10 a series compensated machine with a single 45-degree field winding is obtained. It will of course be understood that any suitable controller may be provided for regulating the relative amounts of current flowing in the two field windings.

The improved machine of my present invention has the characteristics of a series compensated machine. Varying speeds in either direction as well as reversal of the direction of rotation are obtained by merely moving the adjustable intermediate terminal of the resistance or rheostat, so that the circuit of the machine need not be opened to obtain the different conditions of operation. The current automatically divides between the two field windings so as to produce the necessary compensation for all speeds of the machine in both directions. Although I prefer to wind the two field windings so as to form mechanically a single lap winding, it will of course be understood that other types of windings may be employed without departing from the spirit of the invention.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A dynamo-electric machine comprising an armature winding, a field winding adapted to produce a magnetic flux having an exciting component and a compensating component, a second field winding adapted to produce a magnetic flux having an exciting component opposing the exciting component of the first flux and a compensating component acting in conjunction with the compensating component of the first flux, the combined compensating components of said two fluxes being substantially equal and opposite in effect to the armature magnetization, and means for varying the relative effects of the exciting components of said two fluxes.

2. A dynamo-electric machine comprising an armature winding, a field winding adapted to produce a magnetic flux having an exciting component and a compensating component, a second field winding adapted to produce a magnetic flux having an exciting component opposing the exciting component of the first flux and a compensating component acting in conjunction with the compensating component of the first flux, said two field windings being connected in parallel with one another and in series with said armature winding, the combined compensating components of the fluxes of said two field windings being substantially equal and opposite in effect to the armature magnetization, a resistance having a portion thereof connected in series relation with one of said field windings and the remainder thereof connected in series relation with the other of said field windings, and means for varying the relative proportions of said resistance which are included in series relation with said two field windings.

3. A dynamo-electric machine comprising an armature winding, a field winding having its magnetizing axis displaced approximately 45 electrical degrees from the magnetizing axis of the armature winding, a second field winding having its magnetizing axis displaced approximately 90 electrical degrees from the magnetizing axis of the first mentioned field winding and approximately 45 electrical degrees from the magnetizing axis of the armature winding, said two field windings being connected in parallel with one another and in series with said armature winding, and means for varying the relative amounts of current flowing in said two field windings.

4. A dynamo-electric machine comprising an armature winding, a field winding having its magnetizing axis displaced approximately 45 electrical degrees from the magnetizing axis of the armature winding, a second field winding having its magnetizing axis displaced approximately 90 electrical degrees from the magnetizing axis of the first mentioned field winding and approximately 45 electrical degrees from the magnetizing axis of said armature winding, said two field windings being connected in parallel with one another and in series with said armature winding, and a resistance arranged so that a variable portion thereof is connected in series relation with one of said field windings and the remainder thereof is connected in series relation with the other of said field windings, said field windings being so proportioned that the armature reaction is substantially neutralized for all operating conditions of the machine.

5. A dynamo-electric machine comprising an armature winding, two field windings arranged with their magnetizing axes at an angle to each other and to the magentizing axis of said armature winding, said field windings being connected in parallel with one another and in series with said armature winding, and a resistance arranged so that a variable portion thereof is connected in series relation with one of said field windings and the remainder thereof is connected in series relation with the other of said field windings.

6. A dynamo-electric machine comprising an armature winding, two field windings adapted to produce a resultant magnetic flux which substantially neutralizes the armature reaction and provides an exciting field, and means for varying the effective value of said exciting field by varying the relative amounts of current flowing in said two field windings.

7. A dynamo-electric machine comprising an armature winding, two field windings electrically connected in parallel with each other and in series with said armature winding and adapted to produce a resultant magnetic flux which substantially neutralizes the armature reaction and provides an exciting field, said field windings being so arranged that the effective direction and value of said exciting field depends upon the ratio of the currents flowing in said two field windings, a resistance having a portion thereof connected in series relation with one of said field windings and the remainder thereof connected in series relation with the other of said field windings, and means for varying the relative proportions of said resistance which are included in series relation with said two field windings whereby the ratio of the currents flowing in said two field windings is varied.

In witness whereof, I have hereunto set my hand this 14th day of June, 1917.

SVEN R. BERGMAN.

Copies of this patent may be obtained for five cents each, by addressing the "Commissioner of Patents, Washington, D. C."